Nov. 25, 1924.

A. CERVENEC

RAT AND MOUSE TRAP

Filed Jan. 2, 1924

1,517,192

INVENTOR
Andrew Cervenec
BY
ATTORNEY

Patented Nov. 25, 1924.

1,517,192

UNITED STATES PATENT OFFICE.

ANDREW CERVENEC, OF TARENTUM, PENNSYLVANIA.

RAT AND MOUSE TRAP.

Application filed January 2, 1924. Serial No. 683,879.

*To all whom it may concern:*

Be it known that ANDREW CERVENEC, citizen of Austria, residing at Tarentum, in the county of Allegheny and State of Pennsylvania, has invented certain new and useful Improvements in Rat and Mouse Traps, of which the following is a specification.

The invention relates generally to animal traps, and it may be embodied in traps designed to catch rats, mice, or other animals, the invention having more particular reference to a trap in which a tilting platform is arranged to precipitate the animal into a suitable receptacle, which may be filled with water, the invention having for an object the provision of a novel and improved trap of this sort, a further specific object of the invention relating to the provision of a platform hinged between its ends and having the rear portion thereof arranged to swing relatively faster than the front portion.

For further comprehension of the invention and of the objects and advantages thereof, reference will be had to the following description and accompanying drawing, and to the appended claims in which the various novel features of the invention are more particularly set forth.

Figure 1:
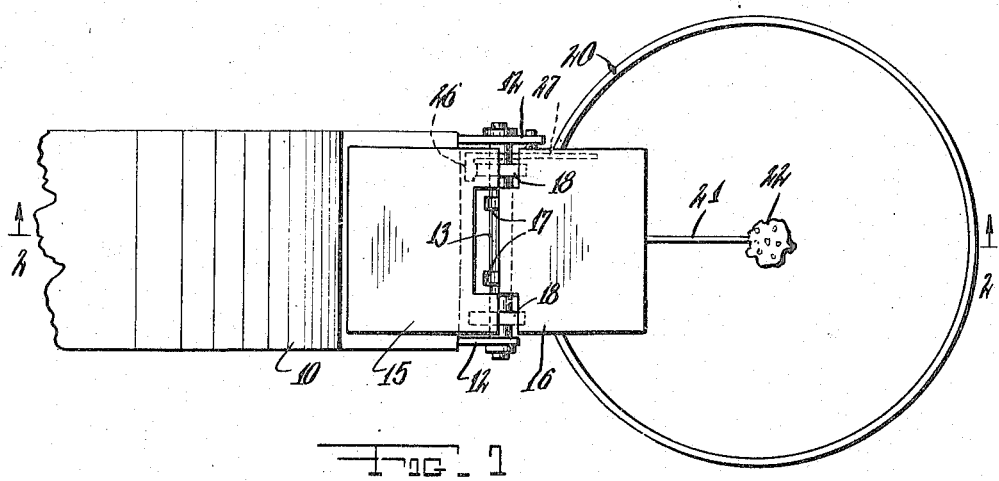

Fig. 1 of the drawing is a plan view of my improved trap.

Figure 2:
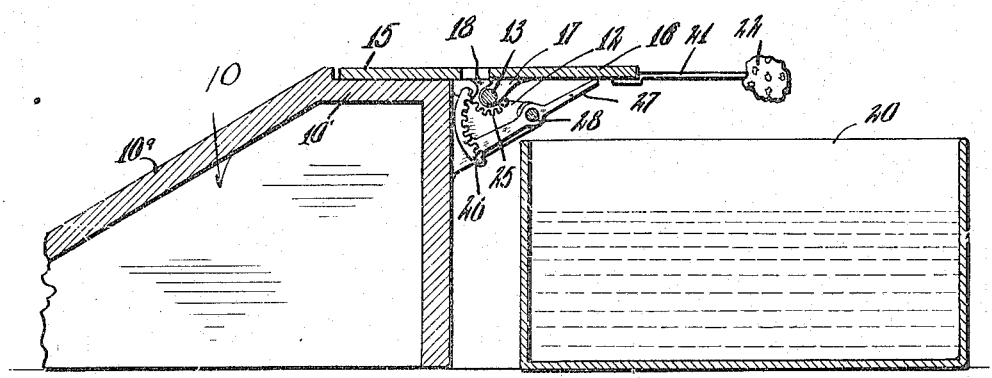

Fig. 2 is a longitudinal vertical sectional view taken on the line 2—2 of Fig. 1.

As here embodied my improved trap comprises a frame element 10 arranged to present a relatively short top horizontal portion 10′ and a longer inclined runway 10ᵃ leading up to said top portion. Fixed to opposite sides of this frame element are the projecting brackets 12 which support a transverse shaft 13 arranged in front of the frame element 10 and slightly below the top thereof. To this shaft 13 are hinged the two valves 15 and 16 respectively, of a tilting platform, the respective platform halves having fixed thereto the hinge elements 17 and 18 which freely engage over the said shaft. The platform half 15 extends rearwardly over the top part 10′ of the frame element 10 and rests thereon, while the platform half 16 extends forwardly over the open top of a receptacle 20 which is here shown as of circular shape, but which may be shaped as desired and which may be partially filled with water. To this platform section is fixed a rod 21 which extends from the free or forward edge thereof and which may have a suitable bait as indicated at 22 attached thereon.

When the animal walks on the front section 16 of the platform to get the bait it overbalances the platform, causing it to tilt, means being provided whereby the rear half of the platform is given an accelerated upward motion. As here shown one of the hinge elements 18 on the rear half of the platform is formed with gear teeth 25 which are engaged by an internal gear segment 26 formed on one end of a rocking lever 27 fulcrumed between its ends as at 28 to one of the brackets 12 forwardly of the shaft 13 and whose other end projects upward under the platform section 16 to be engaged by the latter.

As will be apparent, when the platform section 16 swings downwardly the lever 27 is caused to rock on its fulcrum, swinging the internal gear segment 26 upward, and imparting an increased upward movement to the platform section 15.

While I have illustrated and described a preferred embodiment of my invention it is to be understood that I do not limit myself to the precise construction herein disclosed, and that various changes and modifications might be made therein without departing from the spirit and scope of the invention as defined in the appended claims.

Having thus described my invention what I claim as new and desire to protect by Letters Patent of the United States is as follows:

1. An animal trap comprising a frame element including a runway, a tiltable platform hinged to said frame element, said platform being made up of two sections hinged at adjacent edges, a receptacle under one of said sections, and means for causing the other section to swing upward at a relatively increased speed when the first section swings downward.

2. An animal trap comprising a frame element including a runway, a tiltable platform hinged to said frame element, said platform being made up of two sections hinged at adjacent edges, a receptacle under one of said sections, and means for causing the other section to swing upward at a relatively increased speed when the first section swings downward, said means including a rock lever adapted to be engaged by said first section, and gear connections between said rock lever and the other section.

3. An animal trap comprising a frame element including a runway, a tiltable platform hinged to said frame element, said platform being made up of two sections hinged at adjacent edges, a receptacle under one of said sections, and means for causing the other section to swing upward at a relatively increased speed when the first section swings downward, said means comprising a rock lever fulcrumed between its ends on said frame element, and having one end adapted to be engaged by the said first section, a gear segment on the other end of said lever, and a gear fixed to the other section engaging said segment.

4. An animal trap comprising a frame element, a transverse shaft carried thereby, a pair of platform sections formed on adjacent edges with hinge ears engaged with said shaft, a receptacle under one of said sections, one hinge ear on the other section being formed with gear teeth, a rock lever fulcrumed on said frame forwardly of the said shaft and having one end projecting under the said last named section, an internal gear segment formed on the other end of said lever and engaging the said gear teeth.

In testimony whereof I have affixed my signature.

ANDREW CERVENEC.